(12) United States Patent
Wang

(10) Patent No.: US 6,340,807 B2
(45) Date of Patent: Jan. 22, 2002

(54) TEMPERATURE-PRESERVING ELECTRICALLY HEATED COOKER

(76) Inventor: Dongming Wang, Room 1-415, Luyuan, No. 16 Renmin W. Road, Zhuhai, Guangdong (CN)

( * ) Notice: Subject to any disclaimer, the term of this patent is extended or adjusted under 35 U.S.C. 154(b) by 0 days.

(21) Appl. No.: 09/811,460

(22) Filed: Mar. 20, 2001

(30) Foreign Application Priority Data

Mar. 23, 2000 (CN) .......................................... 00227688
Nov. 16, 2000 (CN) .......................................... 00240172

(51) Int. Cl.[7] ................................................. A47J 27/00
(52) U.S. Cl. ...................................... 219/429; 219/430
(58) Field of Search ................................ 219/429, 432, 219/435, 436, 441, 442; 99/331–333

(56) References Cited

U.S. PATENT DOCUMENTS

| | | | | |
|---|---|---|---|---|
| 3,725,645 A | * | 4/1973 | Shevlin | 219/432 |
| 3,881,090 A | * | 4/1975 | Scott | 219/432 |
| 3,915,079 A | * | 10/1975 | Balderson | 219/432 |
| 4,241,288 A | * | 12/1980 | Aoshima et al. | 219/441 |
| 5,567,458 A | * | 10/1996 | Wu | 219/441 |
| 5,727,448 A | * | 3/1998 | Sa | 219/432 |

FOREIGN PATENT DOCUMENTS

| | | | | |
|---|---|---|---|---|
| DE | 655866 | * | 1/1938 | 219/432 |
| FR | 19347 | * | 12/1914 | 219/432 |
| GB | 2061091 | * | 5/1981 | 219/432 |
| GB | 2105575 | * | 3/1983 | |
| WO | 80/01535 | * | 8/1980 | 219/432 |

OTHER PUBLICATIONS

DE 920,500 Figures, Nov. 1954.*

* cited by examiner

Primary Examiner—Joseph Pelham
(74) Attorney, Agent, or Firm—Nath & Associates PLLC; Gary M. Nath; Marvin C. Berkowitz

(57) ABSTRACT

The invention relates to a temperature-preserving electrically heated cooker comprising a body comprising a housing and a container between which a first temperature-preserving chamber is constituted; a lid connected to the upper part of said body; heating means for heating said container; a controller for controlling a heating time and a heating temperature of said heating means; and a base positioned under said body and connected separately thereto. The temperature-preserving electrically heated cooker according to the invention is of a simple structure, and can be used not only to cook, but also to keep the food warm.

7 Claims, 3 Drawing Sheets

# TEMPERATURE-PRESERVING ELECTRICALLY HEATED COOKER

FIELD OF THE INVENTION

The invention relates to a household cooker, more particularly to a temperature-preserving electrically heated cooker.

BACKGROUND OF THE INVENTION

A conventional electrically heated cooker keeps food warm by intermittently heating, but its structure does not have such a function. To keep food warm for a long time means a big waste of energy. However, a conventional temperature-preserving container cannot be used to cook food.

DISCLOSURE OF THE INVENTION

An object of the invention is to provide a temperature-preserving electrically heated cooker to solve problems in the prior art.

A temperature-preserving electrically heated cooker according to the invention, comprising a body comprising a housing and a container between which a first temperature-preserving chamber is constituted;

a lid connected to the upper part of said body airtightly;

heating means for heating said container;

a controller for controlling a heating time and a heating temperature of said heating means; and a base positioned under said body and connected separately thereto.

Said first temperature-preserving chamber in said body may be a vacuum space or may be filled with insulating materials.

Said lid may comprise a second temperature-preserving chamber, which may be a vacuum space or may be filled with insulating materials.

Said heating means may be a heating film or a plurality of electrically heating tubes positioned on the outside of the container. The number of the electrically heating tubes depends on the heating temperature or the heating time needed for cooking.

Said electrically heating tubes may be disposed on the bottom of the container and/or on the outer side of the container, and may be covered by insulating materials.

In the cooker of the present invention, a control panel may be arranged on the base to control the heating time and the heating temperature.

The temperature-preserving electrically heated cooker according to the invention may further comprise a base support disposed under the body. Insulating materials may be filled between the base support and the body.

BEST MODE FOR CARRYING OUT THE INVENTION

The invention will be described in details with the following examples in conjunction with the accompanying drawings.

EXAMPLE 1

Figure 1:
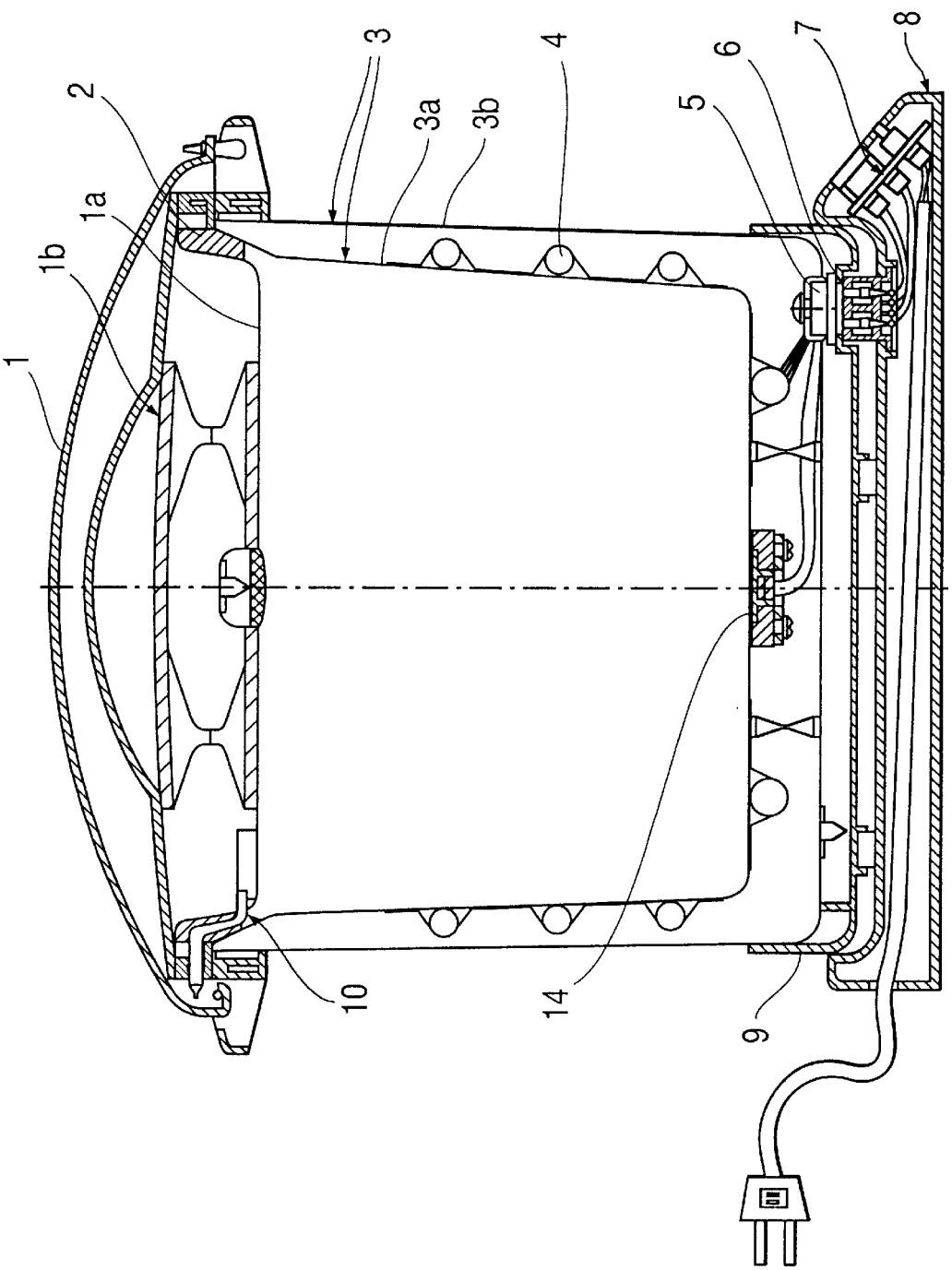
FIG. 1 is a side cross sectional view showing an embodiment of the temperature-preserving electrically heated cooker in accordance with the present invention.

FIG. 1 shows a temperature-preserving electrically heated cooker in accordance with the present invention. In the Figure, an inner wall 1a and an outer wall 1b of a lid 1 constitute a vacuum space; and an inner wall 3a of and an outer wall 3b a body 3 constitute another vacuum space. The lid 1 and the body 3 are tightly locked together with a buckle and a sealing washer 2 to prevent food from leaking or spelling.

Heating means 4 comprising a plurality of electrically heating tubes are arranged on the outer surface of the wall 3a of the body 3. The heating means 4 do not contact the inner surface of the wall 3b of the body 3. Thus, when food in the cooker is heated with the electrically heating tubes, while the outer wall 3b of the body 3 is kept at an ambient temperature. A temperature sensor 14 is fitted on the inner wall 3a of the body 3 and is separated from the inner wall 3a of the body 3 with insulating materials so as to measure the real temperature in the container.

The body 3 of the cooker is fixed on a support 9. A plug 5 connected to the outer wall 3b of the body 3 is set on the support 9. One end of the plug 5 is connected to the heating means 4 and the sensor 14 through a lead and the other end is inserted into a socket 6 set on a base 8. A control panel 7 is set on the base 8 to control the heating time and power of the heating means 4.

When the body 3 is put on the base 8, the plug 5 is inserted into the socket 6. Thus, the container is heated. After food is cooked well, the power is switched off. However, the food is still kept warm for a long time even if the body 3 is moved from the base 8.

An exhaust pipe 10 is fixed on the lid 1. The exhaust pipe 10 is open to air at one end through a sealing washer 2 and the lid 1, and is connected to the inside of the container to discharge the steam therein so that the pressure in the cooker can be reduced for safety.

EXAMPLE 2

Figure 2:
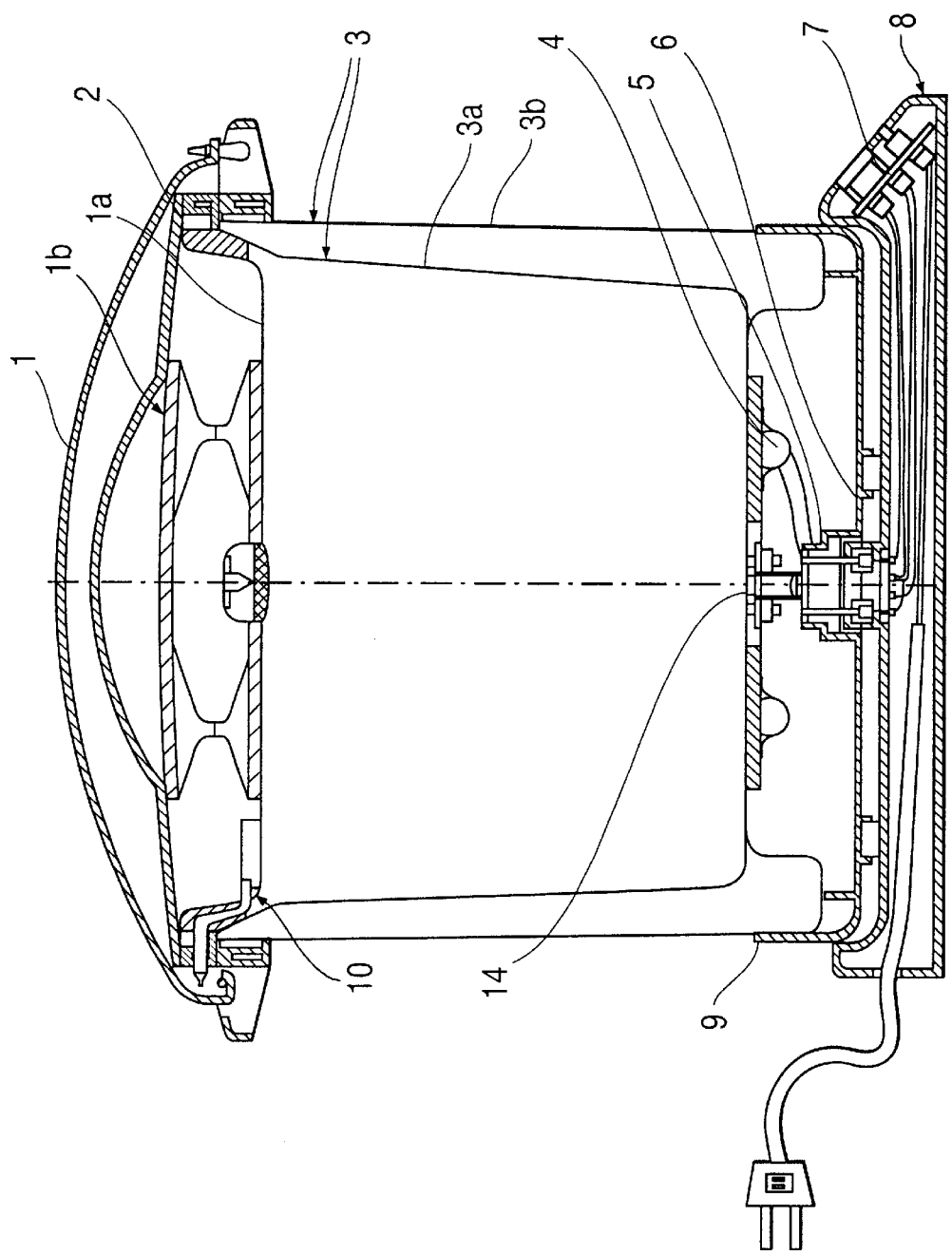
FIG. 2 is a side cross sectional view showing another embodiment of the temperature-preserving electrically heated cooker in accordance with the present invention.

FIG. 2 shows another temperature-preserving electrically heated cooker in accordance with the present invention. In the Figure, heating means 4 is fixed and exposed on the outer surface of the bottom of the body 3. The heating means 4 may consist of a plurality of electrically heating tubes or an electrically film. Said electrically heating tubes are enclosed by the bottom of the body 3 and the support 9 of the body. Other parts of the cooker are the same as those described in Example 1.

EXAMPLE 3

Figure 3:
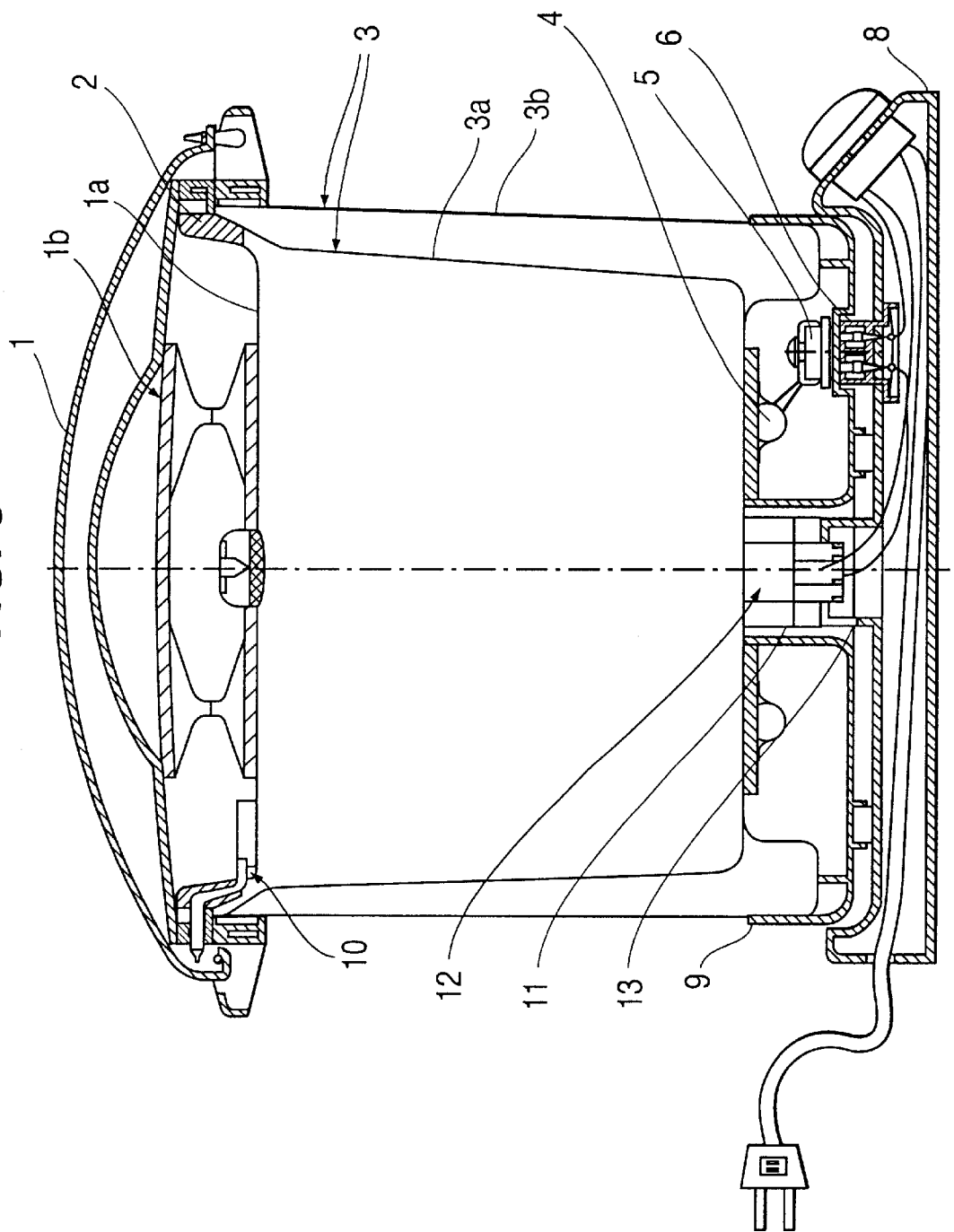
FIG. 3 is a side cross sectional view showing a further embodiment of the temperature-preserving electrically heated cooker in accordance with the present invention.

FIG. 3 shows another temperature-preserving electrically heated cooker in accordance with the present invention. The cooker in this example is similar to that in Example 1, except that a temperature control is set in a mechanical manner.

A stand 11 of a thermostat is set on the base 8. A spring thermostat 12 is set between the housing 13 of the thermostat and the stand 11. When the body 3 is placed on the base 8, the housing of the thermostat contacts the inner wall of the body 3 via a press spring to control the temperature of heating.

The present invention possesses advantages that the cooker is of a simple structure, and can be used not only to cook, but also to keep the food warm.

What I claim is:

1. A temperature-preserving electrically heated cooker comprising:

a body comprising a housing and a container between which a first temperature-preserving chamber is constituted;

a lid connected to an upper part of said body;

heating means for heating said container;

a controller for controlling a heating time and a heating temperature of said heating means; and a base positioned under said body and connected separately thereto;

wherein said cooker further comprises a support under a bottom of the body.

2. A temperature-preserving electrically heated cooker according to claim 1, wherein said first temperature-preserving chamber is a vacuum space.

3. A temperature-preserving electrically heated cooker according to claim 1, wherein said lid comprises a second temperature-preserving chamber.

4. A temperature-preserving electrically heated cooker according to 1, wherein heating means are a plurality of electrically heating tubes positioned on the outer surface of the container.

5. A temperature-preserving electrically heated cooker according to claim 4, wherein said electrically heating tubes are positioned on the bottom or/and on the outer side of the container.

6. A temperature-preserving electrically heated cooker according to claim 4, wherein said electrically heating tubes are covered by insulating materials.

7. A temperature-preserving electrically heated cooker according to claim 1, wherein a control panel is set on the base for setting a heating temperature and a heating time.

* * * * *